United States Patent
Chu (10) Patent No.: US 9,467,277 B2
(45) Date of Patent: Oct. 11, 2016

(54) METHOD AND RELATED COMMUNICATION DEVICE FOR HANDLING COMMUNICATION BETWEEN TIME DIVISION DUPLEX DEVICES

(71) Applicant: HTC Corporation, Taoyuan County (TW)

(72) Inventor: Feng-Seng Chu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 99 days.

(21) Appl. No.: 14/279,273

(22) Filed: May 15, 2014

(65) Prior Publication Data

US 2014/0341092 A1 Nov. 20, 2014

Related U.S. Application Data

(60) Provisional application No. 61/824,354, filed on May 16, 2013.

(51) Int. Cl.
*H04L 5/14* (2006.01)
*H04W 72/04* (2009.01)
*H04W 76/02* (2009.01)

(52) U.S. Cl.
CPC ........ *H04L 5/1469* (2013.01); *H04W 72/0446* (2013.01); *H04W 76/023* (2013.01)

(58) Field of Classification Search
None
See application file for complete search history.

(56) References Cited

U.S. PATENT DOCUMENTS

2012/0093098 A1* 4/2012 Charbit ................ H04W 72/04 370/329

2013/0201954 A1* 8/2013 Gao ................ H04W 72/0413 370/329

(Continued)

FOREIGN PATENT DOCUMENTS

WO 2012019348 A1 2/2012
WO WO 2012091420 A2 * 7/2012 .......... H04W 76/023
WO 2013029545 A1 3/2013

OTHER PUBLICATIONS

European Search report issued on Mar. 17, 2015 for EP application No. 14020059.3, filing date May 16, 2014.

(Continued)

*Primary Examiner* — Hassan Kizou
*Assistant Examiner* — Tejis Daya
(74) *Attorney, Agent, or Firm* — Winston Hsu; Scott Margo (57) ABSTRACT

A method of handling communication between time division duplex (TDD) devices for a network in a wireless communication system includes selecting at least two subframes to be used for a device to device (D2D) communication between a first user equipment (UE) and a second UE in the wireless communication system; indicating to the first UE to use a first subframe of the at least two subframes as an uplink subframe for the D2D communication and use a second subframe of the at least two subframes as a downlink subframe for the D2D communication; and indicating to the second UE to use the first subframe of the at least two subframes as a downlink subframe for the D2D communication and use the second subframe of the at least two subframes as an uplink subframe for the D2D communication.

8 Claims, 9 Drawing Sheets

(56) References Cited

U.S. PATENT DOCUMENTS

| | | | | |
|---|---|---|---|---|
| 2013/0223356 A1* | 8/2013 | Khoshnevis | H04W 72/042 | 370/329 |
| 2014/0003301 A1* | 1/2014 | Madan | H04W 72/042 | 370/280 |
| 2014/0016520 A1* | 1/2014 | Kim | H04L 5/001 | 370/280 |
| 2014/0023008 A1* | 1/2014 | Ahn | H04W 76/023 | 370/329 |
| 2014/0086152 A1* | 3/2014 | Bontu | H04L 1/1812 | 370/329 |
| 2014/0086153 A1* | 3/2014 | Bontu | H04W 4/005 | 370/329 |
| 2014/0153454 A1* | 6/2014 | Samdanis | H04L 5/1469 | 370/280 |
| 2014/0177449 A1* | 6/2014 | Novak | H04W 4/008 | 370/241 |
| 2014/0269338 A1* | 9/2014 | Jung | H04L 5/0055 | 370/241 |
| 2014/0328226 A1* | 11/2014 | Pan | H04W 72/0446 | 370/280 |
| 2015/0049732 A1* | 2/2015 | Xue | H04L 1/1854 | 370/330 |
| 2015/0139197 A1* | 5/2015 | He | H04W 76/048 | 370/336 |

OTHER PUBLICATIONS

HTC, "Physical layer considerations on D2D communication", 3GPP TSG RAN WG1 Meeting #73, R1-132083, May 20-24, 2013, Fukuoka, Japan, XP050697861, pp. 1-2.

Renesas Mobile Europe Ltd, "ProSe direct communication (D2D)", 3GPP TSG-RAN WG1 Meeting #73, R1-132174, May 20-24, 2013, Fukuoka, XP050697950, pp. 1-4.

"Study on LTE Device to Device Proximity Services", 3GPP TSG RAN Meeting #58, RP-122009, 2012.

"Information about the system improvements requirements for the adoption of LTE for mission/business critical communications",3GPP TSG-SA WG1 Meeting #58,S1-121247, May 11, 2012.

"Additional information: Group Communications & Proximity-based Services",Critical Communications Broadband Group (CCBG), SP-120456, CCBG_LS12-001, Jul. 27, 2012.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

METHOD AND RELATED COMMUNICATION DEVICE FOR HANDLING COMMUNICATION BETWEEN TIME DIVISION DUPLEX DEVICES

CROSS REFERENCE TO RELATED APPLICATIONS

This application claims the benefit of U.S. Provisional Application No. 61/824,354, filed on May 16, 2013 and entitled "Method and apparatus for communication between TDD devices", the contents of which are incorporated herein in their entirety.

BACKGROUND OF THE INVENTION

1. Field of the Invention

The present invention relates to a method utilized in a wireless communication and communication device thereof, and more particularly, to a method for handling communication between time division duplex (TDD) devices in a wireless communication system and communication device thereof.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

An LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (COMP), uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Starting from 3GPP Rel-12, a feature is included to allow UEs to communicate with each other directly, which is referred to as device to device (D2D) communication or Proximity-based Services (ProSe) communication. The D2D communication finds its applications on areas including Public Safety and non-Public-Safety services that would be of interest to operators and users. Proximity-based applications and services represent an emerging social-technological trend. The introduction of the device to device communication capability in LTE would allow the 3GPP industry to serve this developing market, and will, at the same time, serve the urgent needs of several Public Safety communities that are jointly committed to LTE.

In a time division duplex (TDD) wireless communication system, when one UE is connecting to an eNB, it needs to acquire the system information which helps the UE to build up the connection. One of the essential system information for the UE operating in a TDD mode is the TDD configuration, which is included in the System Information Block 1 (SIB1). The eNB assigns UEs in a cell an uplink-downlink configuration in the TDD configuration so that the UEs perform uplink transmission at certain subframes and perform downlink transmission at other subframes. This implies that all UEs connected to the same cell have the same uplink/downlink subframe configurations according to the TDD configuration received in the system information. However, in D2D communication, one UE cannot use the same uplink/downlink subframe configuration as another UE when they need to communicate with each other directly.

Thus, how to handle communication between TDD devices for D2D communication is an important topic to be addressed and discussed.

SUMMARY OF THE INVENTION

An objective of the present invention is to provide a method and related communication device for handling communication between time division duplex (TDD) devices so that the device to device (D2D) communication is realized in a TDD system.

The present invention discloses a method of handling communication between time division duplex (TDD) devices for a network in a wireless communication system. The method includes selecting at least two subframes to be used for a device to device (D2D) communication between a first user equipment (UE) and a second UE in the wireless communication system, where the first UE and the second UE are operated in a TDD mode; indicating to the first UE to use a first subframe of the at least two subframes as an uplink subframe for the D2D communication and use a second subframe of the at least two subframes as a downlink subframe for the D2D communication; and indicating to the second UE to use the first subframe of the at least two subframes as a downlink subframe for the D2D communication and use the second subframe of the at least two subframes as an uplink subframe for the D2D communication.

The present invention further discloses a method of handling communication between time division duplex (TDD) devices for a user equipment (UE) in a wireless communication system. The method includes receiving an indication from a network of the wireless communication system which indicates to the UE to use a first subframe as an uplink subframe for a device to device (D2D) communication and use a second subframe in the frame as a downlink subframe for the D2D communication; transmitting D2D data at the first subframe for the D2D communication; and receiving D2D data at the second subframe for the D2D communication; wherein the UE is operated in a TDD mode.

The present invention further discloses a communication device for handling communication between time division duplex (TDD) devices in a wireless communication system. The communication device includes a processing means; and a storage unit, coupled to the processing means, for storing a program code, wherein the program code instructs the processing means to execute the following steps of selecting at least two subframes to be used for a device to device (D2D) communication between a first user equipment (UE) and a second UE in the wireless communication system, where the first UE and the second UE are operated in a TDD mode; indicating to the first UE to use a first subframe of the at least two subframes as an uplink subframe for the D2D communication and use a second subframe of the at least two subframes as a downlink subframe for the D2D communication; and indicating to the second UE to use the first subframe of the at least two subframes as a downlink subframe for the D2D communication and use the second subframe of the at least two subframes as an uplink subframe for the D2D communication.

The present invention further discloses a communication device for handling communication between time division duplex (TDD) devices in a wireless communication system. The communication device includes a processing means; and a storage unit, coupled to the processing means, for storing a program code, wherein the program code instructs the processing means to execute the following steps of receiving an indication from a network of the wireless communication system which indicates to the communication device to use a first subframe as an uplink subframe for a device to device (D2D) communication and use a second subframe in the frame as a downlink subframe for the D2D communication; transmitting D2D data at the first subframe for the D2D communication; and receiving D2D data at the second subframe for the D2D communication; wherein the communication device is operated in a TDD mode.

The present invention further discloses a method of handling data transmission and reception for a device to device (D2D) communication between a first user equipment (UE) and a second UE for a network in a wireless communication system. The method includes configuring the first UE a first parameter as one transmission parameter of the first UE, and configuring the first UE a second parameter as one reception parameter of the first UE; and configuring the second UE the second parameter as one transmission parameter of the second UE, and configuring the second UE the first parameter as one reception parameter of the second UE.

The present invention further discloses a communication device for handling data transmission and reception for a device to device (D2D) communication between a first user equipment (UE) and a second UE in a wireless communication system. The communication device includes a processing means; and a storage unit, coupled to the processing means, for storing a program code, wherein the program code instructs the processing means to execute the following steps of configuring the first UE a first parameter as one transmission parameter of the first UE, and configuring the first UE a second parameter as one reception parameter of the first UE; and configuring the second UE the second parameter as one transmission parameter of the second UE, and configuring the second UE the first parameter as one reception parameter of the second UE.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
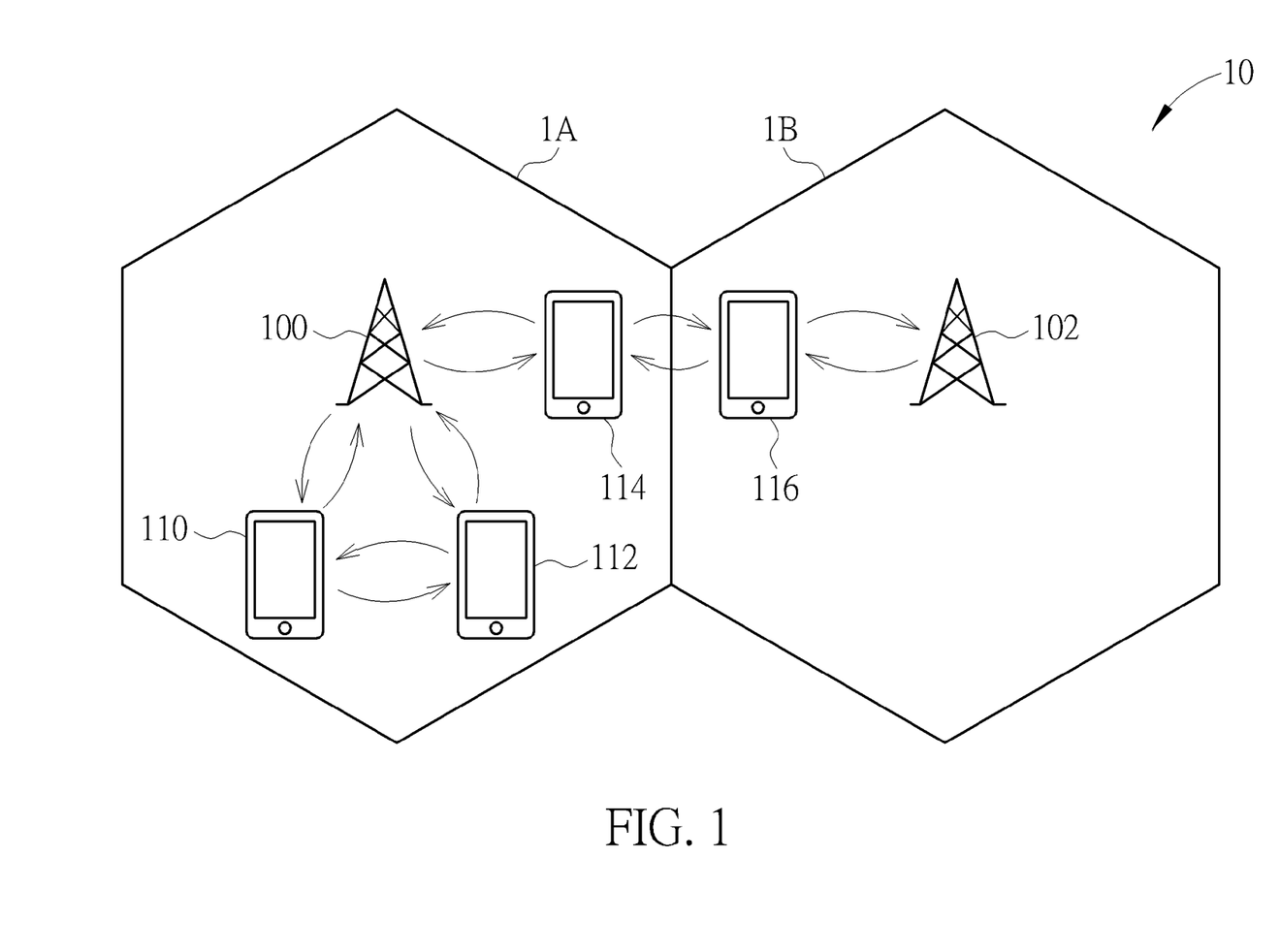
FIG. 1 is a schematic diagram of a wireless communication system according to an example of the present invention.

Please refer to FIG. 1, which is a schematic diagram of a wireless communication system 10 according to an example of the present invention. A wireless communication system which is applicable to the present invention may include at least one base station and at least two user equipments (UEs). In FIG. 1, UEs 110, 112, 114, and 116 and a network including base stations 100, 102 and are depicted to illustrate the examples of inter-cell D2D communication and intra-cell D2D communication. The base station 100 provides radio coverage to a cell 1A, and the base station 102 provides radio coverage to a cell 1B, in which the UE 110 and the UE 112 perform intra-cell D2D communication in cell 1A, and the UE 114 and the UE 116 perform inter-cell D2D communication between cell 1A and cell 1B. The cell 1A/1B may be a macrocell, a microcell, a picocell, a femtocell, or any other type of cell where radio coverage is provided.

For the sake of simplicity of FIG. 1, only the base stations 100 and 102 are depicted in the network of the wireless communication system 10. Practically, the network can be a universal terrestrial radio access network (UTRAN) comprising a plurality of Node-Bs (NBs) in a universal mobile telecommunications system (UMTS), and the base stations 100 and 102 are two of the NBs in the UMTS. Alternatively, the network can be an evolved UTRAN (E-UTRAN) comprising a plurality of evolved NBs (eNBs) and/or relays in a long term evolution (LTE) system or a LTE-Advanced (LTE-A) system, and the base stations 100 and 102 are two of the eNBs and/or relays in the LTE or LTE-A system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a UE, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information can be processed by both the UTRAN/E-UTRAN and the core network, and the decisions are made after coordination and/or cooperation are performed by the UTRAN/E-UTRAN and the core network.

The UEs can be portable communication devices for performing speech and data communication through the network such as the UMTS, the LTE system or the LTE-A system. In addition, the network and one of the UEs can be seen as a transmitter or a receiver according to transmission direction, e.g., for an uplink (UL), the communication device is the transmitter and the network is the receiver, and for a downlink (DL), the network is the transmitter and the communication device is the receiver.

Figure 2:
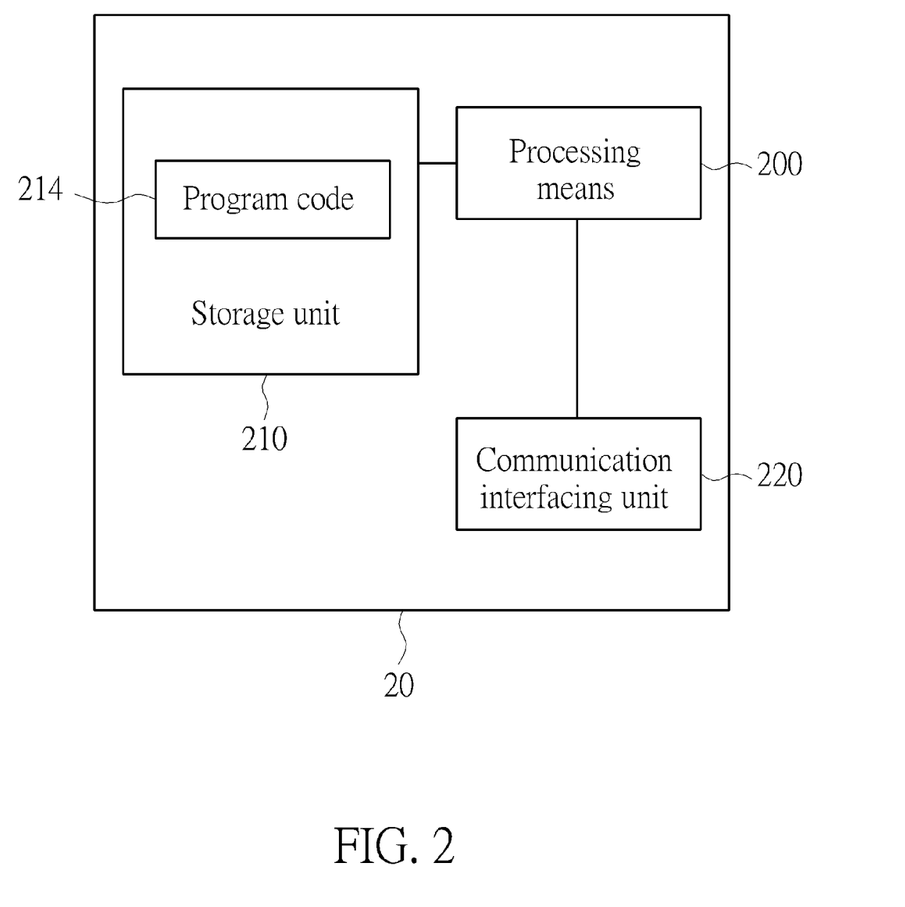
FIG. 2 is a schematic diagram of a communication device according to an example of the present invention.

Please refer to FIG. 2, which is a schematic diagram of a communication device 20 according to an example of the present invention. The communication device 20 may be equipped in a network element such as the base station 100 or 102, or the UEs 110, 112, 114, and 116 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
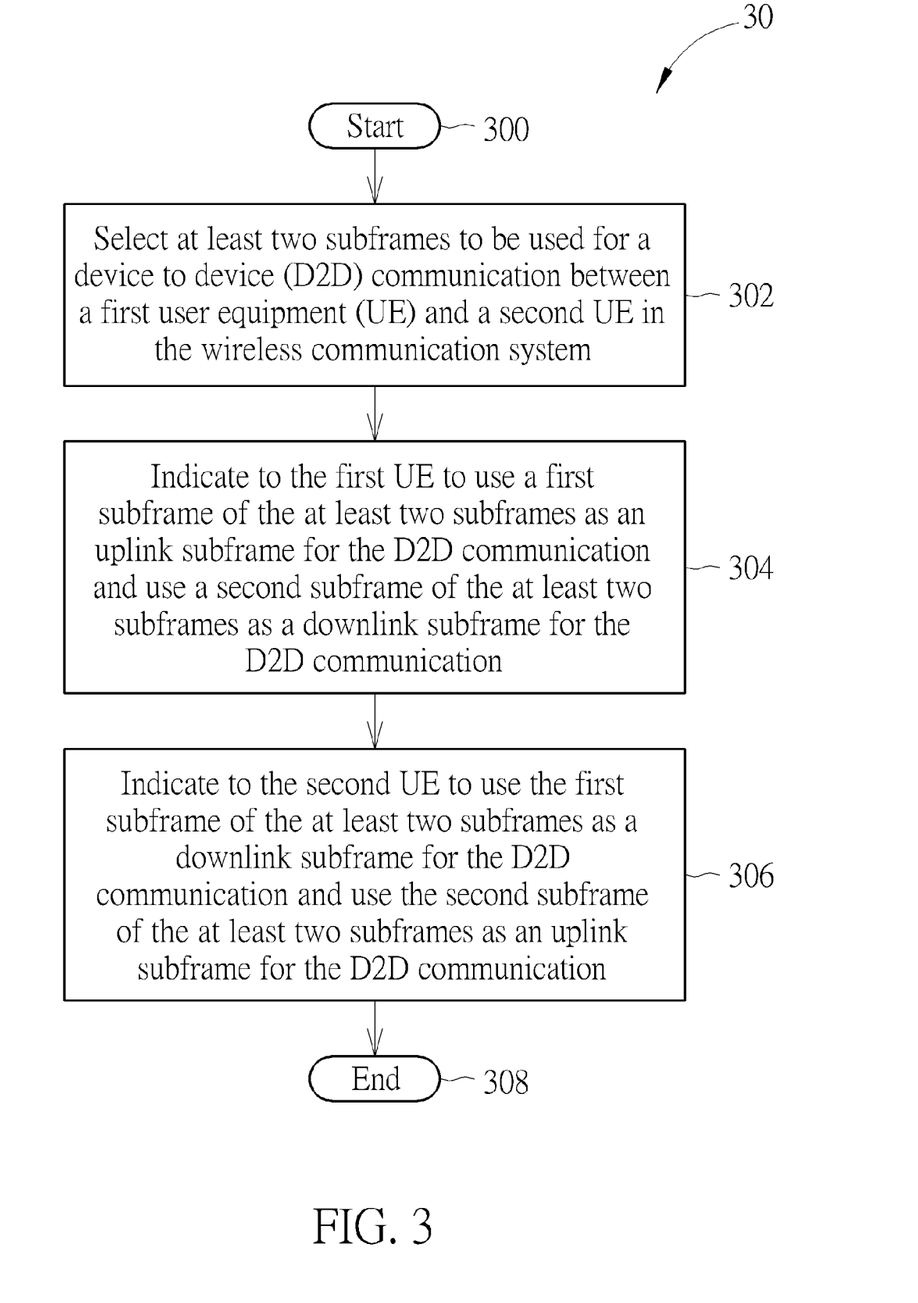
FIG. 3 is a flowchart of a process according to an example of the present invention.

Please refer to FIG. 3, which is a flowchart of a process 30 according to an example of the present invention. The process 30 is utilized for a network to handle direct communication, such as device to device (D2D) communication or ProSe communication of direct data path type, between time division duplex (TDD) devices in a wireless communication system 10, in which the UEs are operated in a TDD mode. The process 30 may be performed by the communication device 20 and may be compiled into the program code 214 to instruct the processing means 200 to execute the following steps:

Step 300: Start.

Step 302: Select at least two subframes to be used for a device to device (D2D) communication between a first user equipment (UE) and a second UE in the wireless communication system.

Step 304: Indicate to the first UE to use a first subframe of the at least two subframes as an uplink subframe for the D2D communication and use a second subframe of the at least two subframes as a downlink subframe for the D2D communication.

Step 306: Indicate to the second UE to use the first subframe of the at least two subframes as a downlink subframe for the D2D communication and use the second subframe of the at least two subframes as an uplink subframe for the D2D communication.

Step 308: End.

According to the process 30, when two UEs in a TDD mode intend to communicate with each other, the network configures both UEs at least a downlink (DL) subframe and an uplink (UL) subframe for the D2D communication. The principle of the configuration is to allow the UL subframe of the first UE to transmit as the DL subframe of the second UE to receive, the DL subframe of the first UE to receive as the UL subframe of the second UE to transmit, and this configuration shall be indicated for D2D communication. In other words, the UL subframe of the transmitting UE shall be the DL subframe of the receiving UE for the D2D communication.

Figure 4:
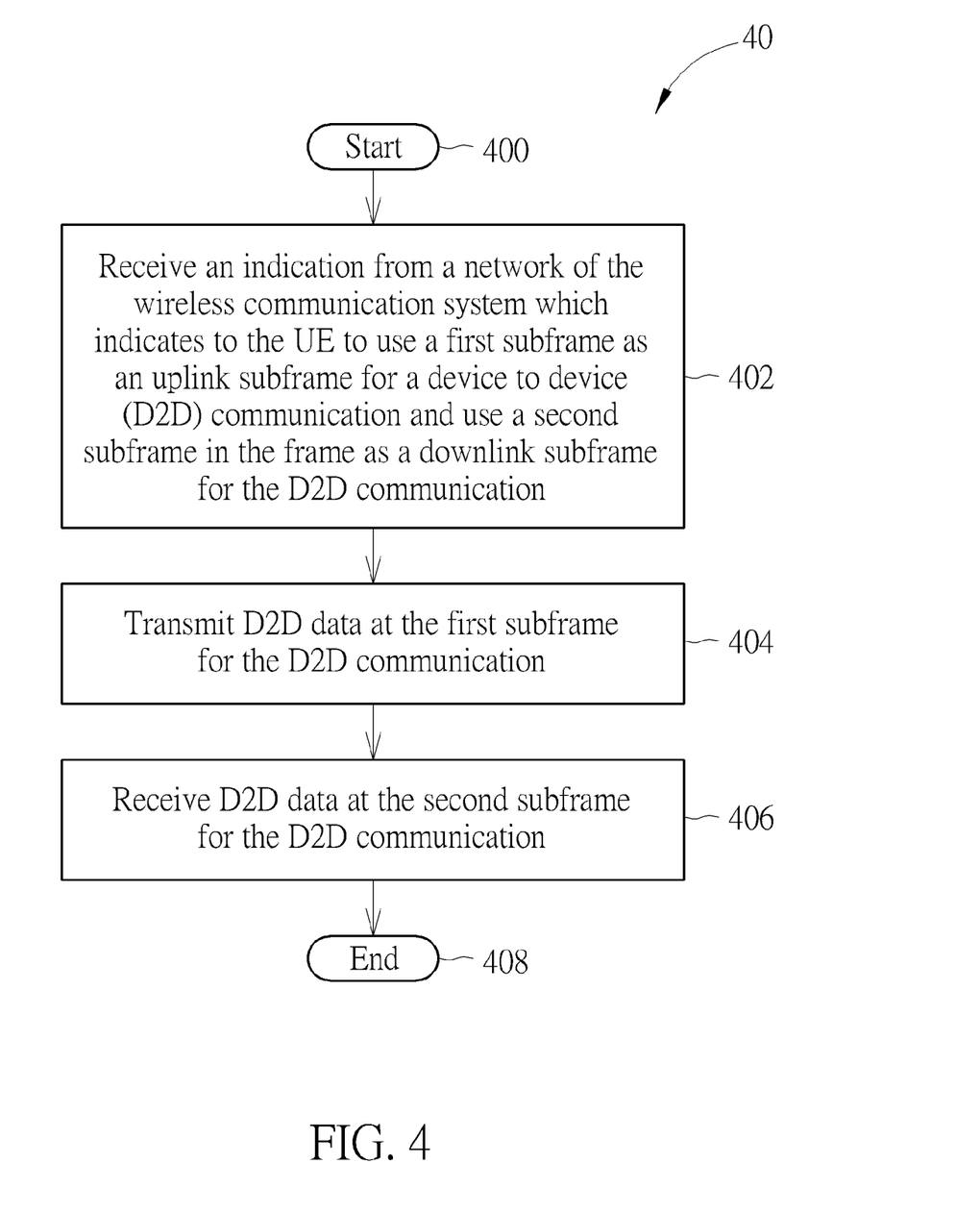
FIG. 4 is a flowchart of a process according to an example of the present invention.

Please refer to FIG. 4, which is a flowchart of a process 40 according to an example of the present invention. The process 40 is utilized for a UE to handle D2D communication in a wireless communication system, wherein the UE is operated in a TDD mode. The UE may be the UEs 110, 112, 114, or 116 in the wireless communication system 10 shown in FIG. 1. The process 40 may be performed by the communication device 20 and may be compiled into the program code 214 to instruct the processing means 200 to execute the following steps:

Step 400: Start.

Step 402: Receive an indication from a network of the wireless communication system which indicates to the UE to use a first subframe as an uplink subframe for a device to device (D2D) communication and use a second subframe in the frame as a downlink subframe for the D2D communication.

Step 404: Transmit D2D data at the first subframe for the D2D communication.

Step 406: Receive D2D data at the second subframe for the D2D communication.

Step 408: End.

According to the process 40, the UE receives the configuration (e.g., the indication received from the base stations of the wireless communication), and understands which subframe is the uplink subframe for the D2D communication and which subframe is the downlink subframe for the D2D communication. Then, the UE may transmit D2D data at the uplink subframe indicated for the D2D communication, and receive D2D data at the downlink subframe indicated for D2D communication. The steps of the process 40 may be used in the UE which is connected to a network performing the steps of the process 30, and thus the corresponding examples, modifications and/or alterations on the UE can be made accordingly. In this way, D2D communication between devices operated in a TDD mode may be enabled.

Figure 5:
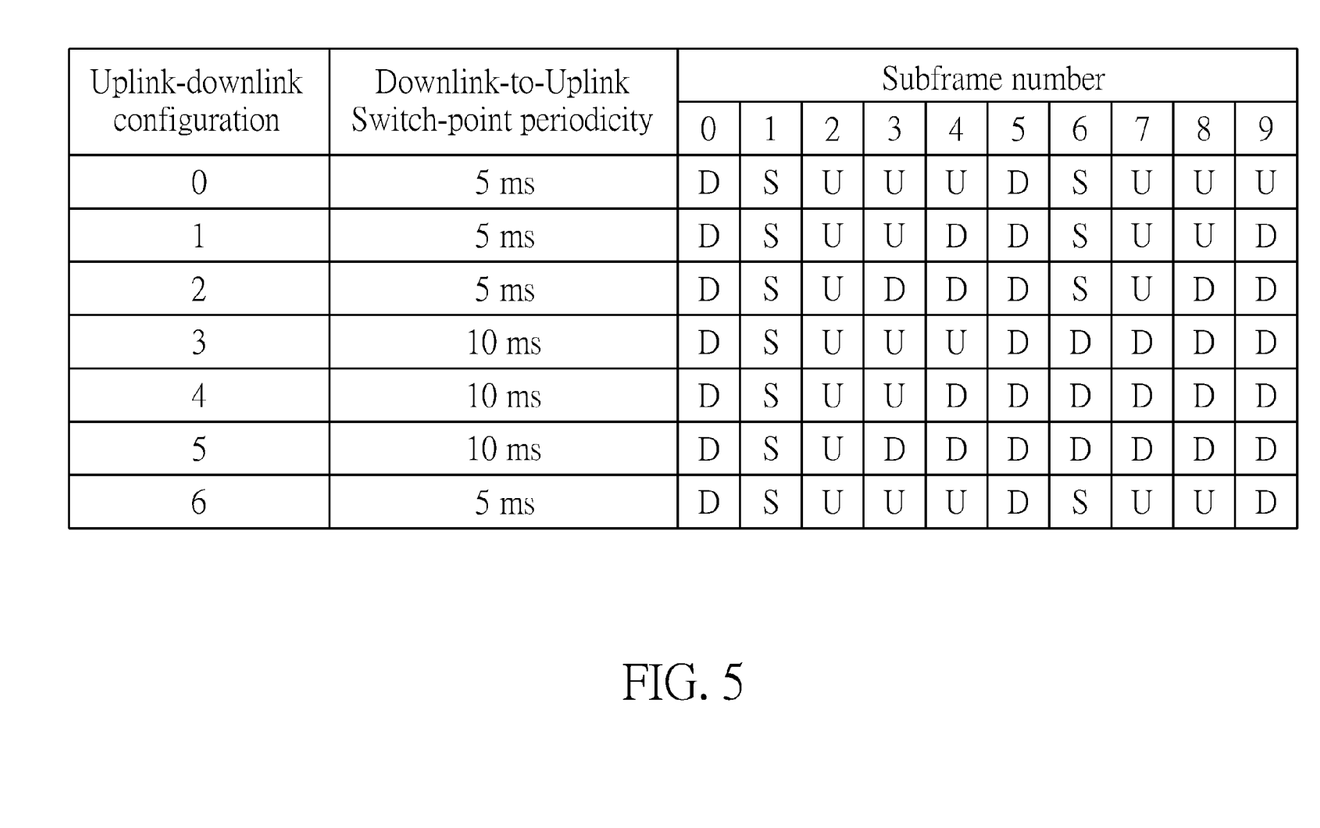
FIG. 5 illustrates TDD uplink-downlink configurations according to an example of the present invention.

In detail, in order for the first UE and the second UE to build up the connection with the network, the network may assign each UE an uplink-downlink configuration via the System Information Block 1 (SIB1). FIG. 5 illustrates a number of TDD uplink-downlink configurations according to an example of the present invention. For non-D2D communication, the first UE and the second UE may communicate with the network according to an uplink-downlink configuration assigned by the network. When the first UE and the second UE intend to communicate with each other directly, the network needs to indicate to the first UE and the second UE to use different subframe configurations for the D2D communication according to the process 30. The subframe configurations for the D2D communication may be indicated in a radio resource control (RRC) configuration and/or a dynamic configuration.

Figure 6:
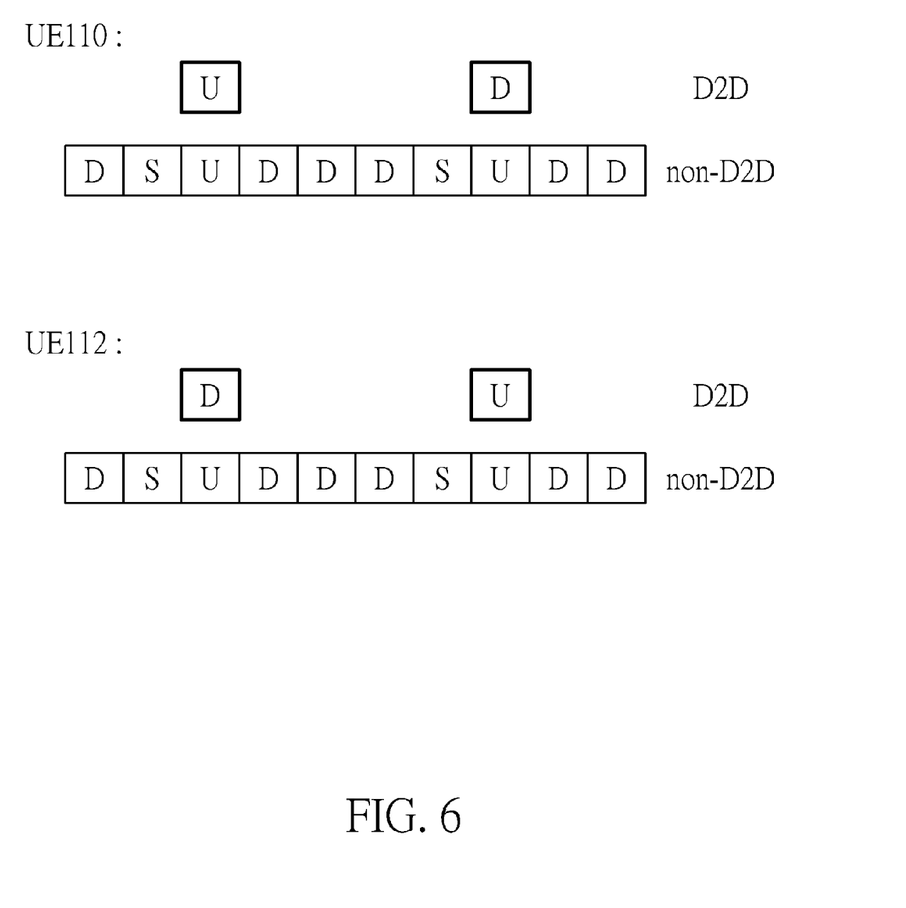
FIG. 6 is a diagram of uplink/downlink subframe configurations for TDD devices connected to the same cell for non-D2D communication and D2D communication according to an example of the present invention.

FIG. 6 illustrates an example of subframe configurations of the first UE and the second UE when the UEs are in the same cell. The first UE may be the UE 110 and the second UE may be the UE 112 shown in FIG. 1, and they are both connected to the cell 1A in the wireless communication system 10. In FIG. 6, each small box represents one subframe and contains characters "D", "U", or "S", which represent a DL subframe, a UL subframe, and a special subframe, respectively. The network assigns the same uplink-downlink configuration (e.g., the configuration 2 as shown in FIG. 5) to the UE 110 and the UE 112 for non-D2D communication. When the UE 110 and the UE 112 intend to perform a D2D communication with each other, the network selects the 3rd subframe and the 8th subframe for the D2D communication. The network then indicates to the UE 110 to use the 3rd subframe as an uplink subframe for the D2D communication and use the 8th subframe as a downlink subframe for the D2D communication. On the other hand, the network indicates to the UE 112 to use the 3rd subframe as a downlink subframe for the D2D communication and use the 8th subframe as an uplink subframe for the D2D communication. The indication for the D2D communication may overwrite the uplink-downlink configuration at the 3rd subframe and the 8th subframe. In this way, the UE 110 and the UE 112 may perform the D2D communication with each other at the 3rd subframe and the 8th subframe, and perform non-D2D communication at other subframes.

Note that the process 30 is an example of the present invention, and those skilled in the art should readily make combinations, modifications and/or alterations on the above-mentioned description and examples. For example, the network may indicate to the UEs to use more than one subframe as the uplink subframe and the downlink subframe for the D2D communication in a single frame, and is not limited herein. Moreover, the at least two subframes (i.e. the 3rd subframe and the 8th subframe in the example of FIG. 6) may be corresponded to a UL subframe of the uplink-downlink configuration, but is not limited herein. The at least two subframes selected for the D2D communication may be corresponded to a different subframe configuration of the uplink-downlink configuration, or may be any subframes selected according to the user or the operator setting (e.g., the 1st and the 2nd subframes).

Figure 7:
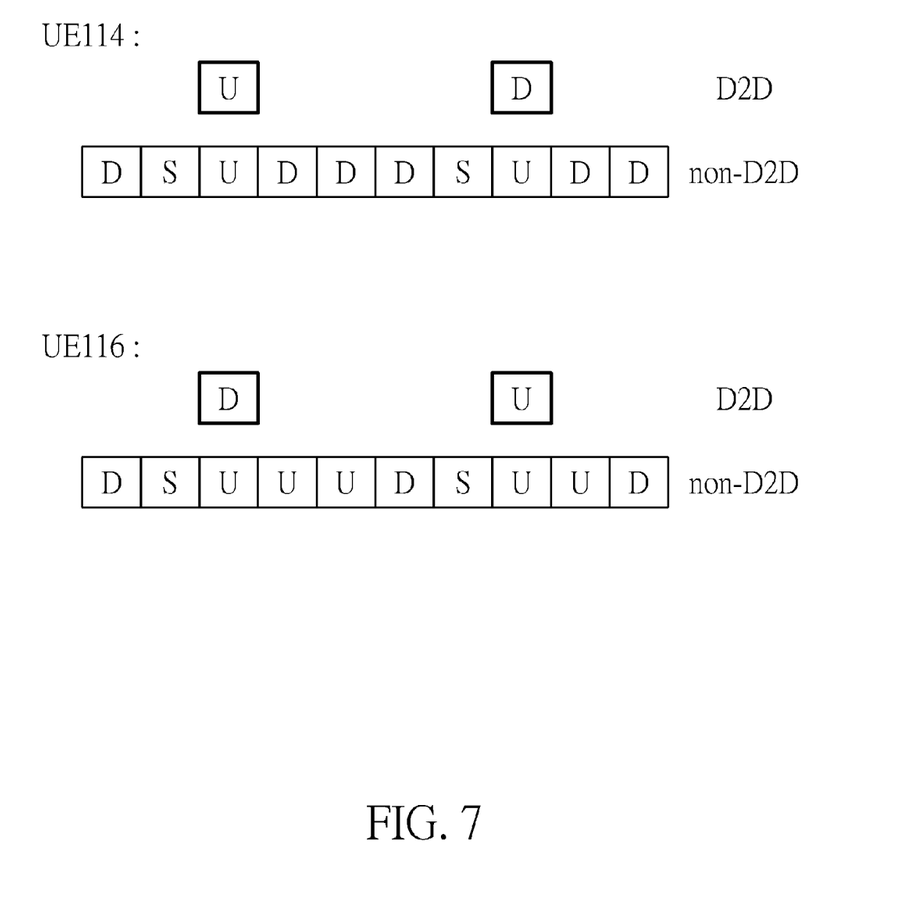
FIG. 7 is a diagram of uplink/downlink subframe configurations for TDD devices connected to the different cells for non-D2D communication and D2D communication according to an example of the present invention.

FIG. 7 illustrates an example of subframe configurations of the first UE and the second UE when the UEs are in different cells. The first UE may be the UE 114 and the second UE may be the UE 116 shown in FIG. 1, and they are connected to the cell 1A and the cell 1B in the wireless communication system 10, respectively. Since the UE 114 and the UE 116 are connected to different cells, the network may assign different uplink-downlink configurations to the UE 114 and the UE 116 for non-D2D communication. In this example, the network assigns the configuration 2 to the UE 114 and assigns the configuration 6 to the UE 116 for non-D2D communication. When the UE 114 and the UE 116 intend to perform a D2D communication with each other, the network selects the 3rd subframe and the 8th subframe for the D2D communication. The network then indicates to the UE 114 to use the 3rd subframe as an uplink subframe for the D2D communication and use the 8th subframe as a downlink subframe for the D2D communication. On the other hand, the network indicates to the UE 116 to use the 3rd subframe as a downlink subframe for the D2D communication and use the 8th subframe as an uplink subframe for the D2D communication. Similar to the example of FIG. 6, the indication for the D2D communication in the example of FIG. 7 may overwrite the uplink-downlink configuration at the 3rd subframe and the 8th subframe. Thus, the UE 114 and the UE 116 may perform the D2D communication with each other at the 3rd subframe and the 8th subframe, and perform non-D2D communication at other subframes.

Figure 8:
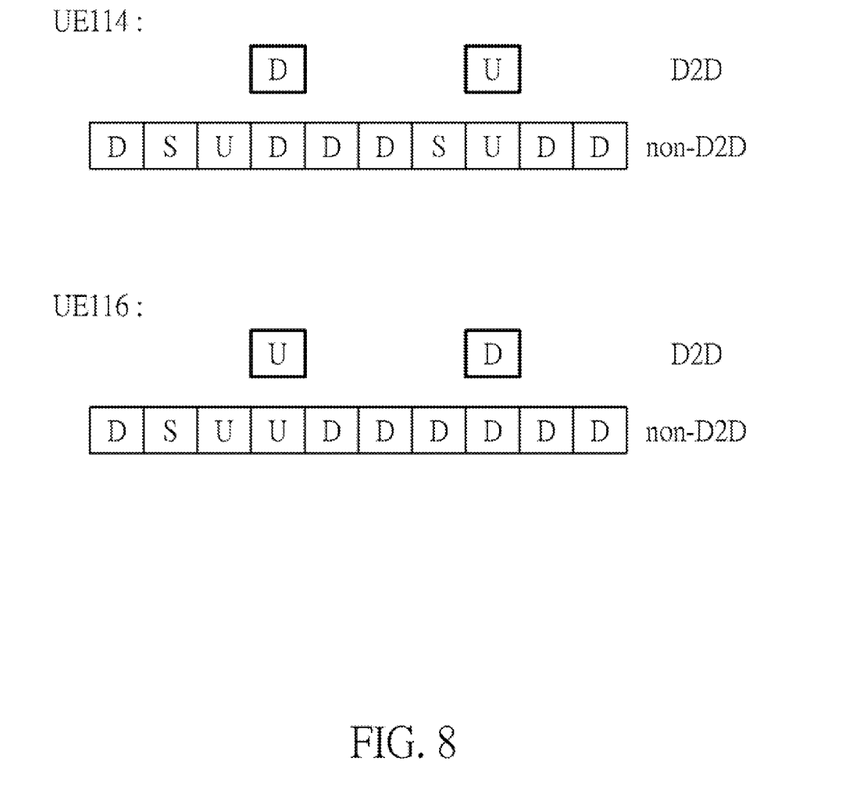
FIG. 8 is a diagram of uplink/downlink subframe configurations for TDD devices connected to the different cells for non-D2D communication and D2D communication according to an example of the present invention.

FIG. 8 illustrates another example of subframe configurations of the first UE and the second UE when the UEs are in different cells. The first UE may be the UE 114 and the second UE may be the UE 116 shown in FIG. 1, and they are connected to the cell 1A and the cell 1B in the wireless communication system 10, respectively. Since the UE 114 and the UE 116 are connected to different cells, the network may assign different uplink-downlink configurations to the UE 114 and the UE 116 for non-D2D communication. In this example, the network assigns the configuration 2 to the UE 114 and assigns the configuration 4 to the UE 116 for non-D2D communication. When the UE 114 and the UE 116 intend to perform a D2D communication with each other, the network selects the 4th subframe and the 8th subframe for the D2D communication. Note that the uplink-downlink configuration 2 and the uplink-downlink configuration 4 have complementary subframe configurations at the 4th subframe and the 8th subframe, so the network may configure the same subframe configurations for the D2D communication as those for non-D2D communication. That is, the network may indicate to the UE 114 to use the 4th subframe as a downlink subframe for the D2D communication and use the 8th subframe as an uplink subframe for the D2D communication; on the other hand, the network indicates to the UE 116 to use the 4th subframe as an uplink subframe for the D2D communication and use the 8th subframe as a downlink subframe for the D2D communication. Thus, the UE 114 and the UE 116 may perform the D2D communication with each other at the 4th subframe and the 8th subframe, and perform non-D2D communication at other subframes.

Figure 9:
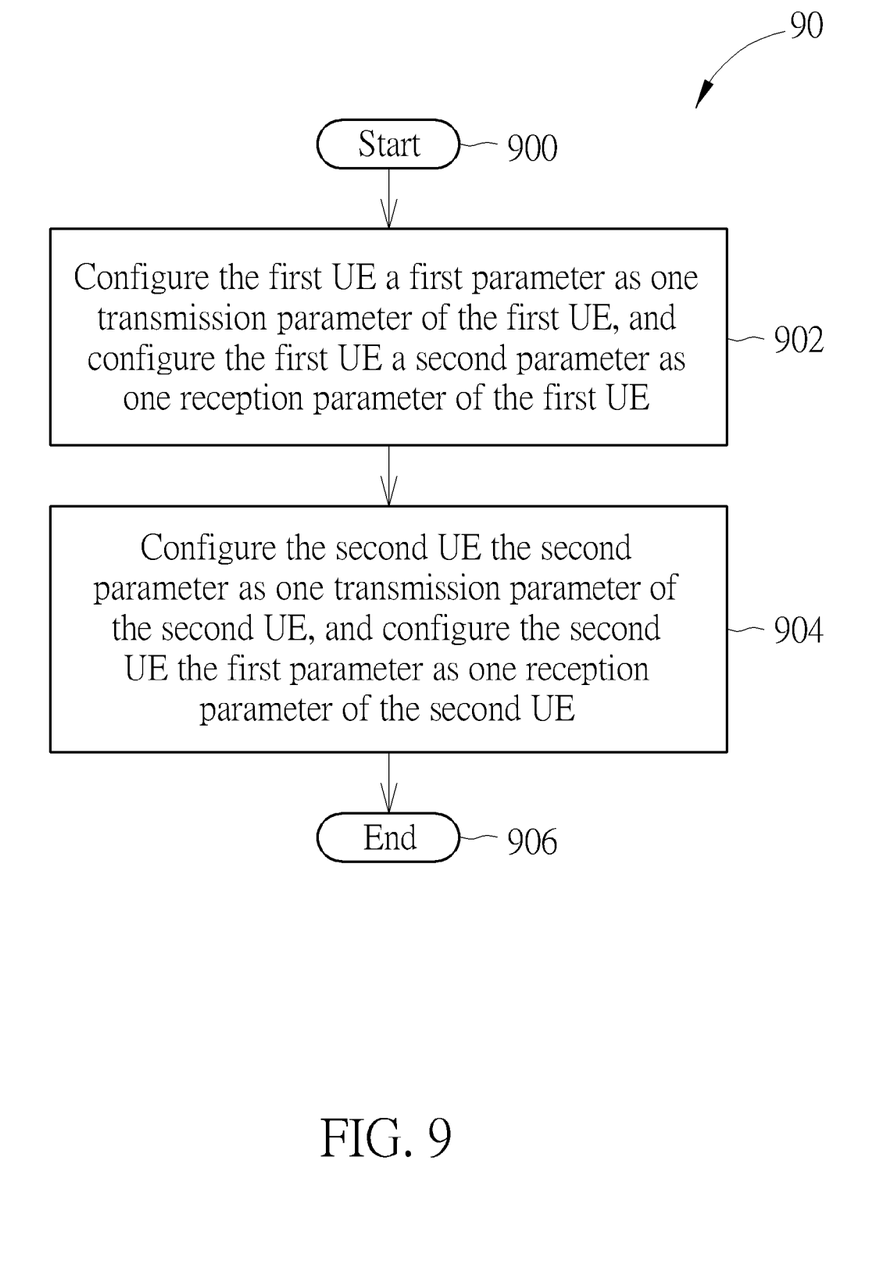
FIG. 9 is a flowchart of a process according to an example of the present invention.

For the data transmission and reception aspect, the network may configure the reception parameter set of one UE as the transmission parameter set of another UE, and vice versa, for the D2D communication. Please refer to FIG. 9, which is a flowchart of a process 90 according to an example of the present invention. The process 90 is utilized for a network to handle data transmission and reception for direct communication, such as device to device (D2D) communication or ProSe communication of direct data path type, between two UEs in a wireless communication system. The wireless communication system may be the wireless communication system 10, and the UEs may be the UEs 110 and 112 or the UEs 114 and 116 shown in FIG. 1. The process 90 may be performed by the communication device 20 and may be compiled into the program code 214 to instruct the processing means 200 to execute the following steps:

Step 900: Start.

Step 902: Configure the first UE a first parameter as one transmission parameter of the first UE, and configure the first UE a second parameter as one reception parameter of the first UE.

Step 904: Configure the second UE the second parameter as one transmission parameter of the second UE, and configure the second UE the first parameter as one reception parameter of the second UE.

Step 906: End.

When the first UE and the second UE intend to communicate with each other directly, the network configures each UE a set of transmission parameters and a set of reception parameters for D2D communication. According to the process 90, the network may configure a parameter P1 in the set of transmission parameters for the first UE and also configure the parameter P1 in the set of reception parameters configured for the second UE. On the other hand, the network may configure a parameter P2 in the set of reception parameters configured for the first UE and also configure the parameter P2 in the set of transmission parameters configured for the second UE. Accordingly, the first UE may encode signals according to the parameter P1 for D2D data transmission and decode signals received from the second UE according to the parameter P2 for D2D data reception. On the contrary, the second UE may encode signals according to the parameter P2 for D2D data transmission and decode signals received from the first UE according to the parameter P1 for D2D data reception. As a result, the UE may have the capability to decode the signal from the other UE for D2D communication.

In detail, the network may configure the first UE and the second UE for the D2D communication via radio resource control (RRC) configuration and/or dynamic configuration. In an example, the parameters P1 and P2 may be dedicated for the D2D communication. That is, the parameters in the set of transmission parameters may be specific for D2D communication, which implies the transmission parameters for D2D communication may be different from the transmission parameters for non-D2D communication. Also, the parameters in the set of reception parameters may be specific for D2D communication, which implies the reception parameters for D2D communication may be different from the reception parameters for non-D2D communication. In another example, the parameters P1 and P2 may be used for both the D2D communication and non-D2D communication. In other words, the transmission parameters for D2D communication may be the same as the transmission parameters for non-D2D communication. Also, the reception parameters for D2D communication may be the same as the reception parameters for non-D2D communication.

An example of the transmission/reception parameters may include a Radio Network Temporary Identifier (RNTI) in an LTE or LTE-A system. When the first UE and the second UE intend to communicate with each other, the network may configure a parameter D2D-RNTI1 as one transmission parameter and a parameter D2D-RNTI2 as one reception parameter of the first UE. On the other hand, the network configures the parameter D2D-RNTI2 as one transmission parameter and the parameter D2D-RNTI1 as one reception parameter of the second UE. As a result, the parameter D2D-RNTI1 is in the set of transmission parameters of the first UE and is also in the set of reception parameters of the second UE; and the parameter D2D-RNTI2 is in the set of transmission parameters of the second UE and is also in the set of reception parameters of the first UE. The parameters D2D-RNTI1 and D2D-RNTI2 may be included in downlink control information (DCI) on physical downlink control channel (PDCCH) of the first UE and the second UE. The transmission parameter D2D-RNTI1 of the first UE may be specific for the D2D communication, and may be different from a transmission parameter C-RNTI1 of the first UE for non-D2D communication. Also, the transmission parameter D2D-RNTI2 of the second UE may be specific for the D2D communication, and may be different from a transmission parameter C-RNTI2 of the second UE for non-D2D communication. The first UE reads the DCI in PDCCH so as to be configured with the parameter D2D-RNTI1 as a transmission parameter and with the parameter D2D-RNTI2 as a reception parameter for the D2D communication. The second UE also reads the DCI in PDCCH so as to be configured with the parameter D2D-RNTI2 as a transmission parameter and the parameter D2D-RNTI1 as a reception parameter for the D2D communication. Accordingly, the first UE scrambles signals before transmission by a scrambling sequence initialized by the parameter D2D-RNTI1, and the second UE descrambles the signals received from the first UE by a scrambling sequence initialized by the parameter D2D-RNTI1. On the other hand, the second UE scrambles signals before transmission by a scrambling sequence initialized by the parameter D2D-RNTI2, and first UE descrambles the signals received from the second UE by a scrambling sequence initialized by the parameter D2D-RNTI2. Consequently, the first UE and the second UE can properly descramble the signals received for the D2D communication.

Another example of the transmission/reception parameters may include a demodulation reference signal (DM-RS) in an LTE or LTE-A system. As for D2D data transmission, the network may configure the first UE a set of transmission parameters TPS1 and configure the second UE a set of transmission parameters TPS2 for the D2D communication between the first UE and the second UE. The transmission parameter set TPS1 includes at least a resource allocation configuration 1, an orthogonal sequence 1, and cyclic shifts 1 applied to a DM-RS generation by the first UE. The transmission parameter set TPS2 includes at least a resource allocation configuration 2, an orthogonal sequence 2, and cyclic shifts 2 applied to a DM-RS signal generation by the second UE. The transmission parameter set TPS1 is included in a DCI on PDCCH transmitted to the first UE, and the transmission parameter set TPS2 is included in a DCI on PDCCH transmitted to the second UE. As for D2D data reception, the network may configure the first UE the reception parameter set RPS1 and configure the second UE the reception parameter set RPS2 for the D2D communication between the first UE and the second UE. The reception parameter set RPS1 includes at least the resource allocation configuration 2, the orthogonal sequence 2, and the cyclic shifts 2, which are also included in the transmission parameter set TPS2 such that the first UE can decode the DM-RS received from the second UE based on the reception parameter set RPS1. The reception parameter set RPS2 includes at least the resource allocation configuration 1, the orthogonal sequence 1, and the cyclic shifts 1, which are also included in transmission parameter set TPS1 such that the second UE can decode the DM-RS received from the first UE based on the reception parameter set RPS2. The reception parameter set RPS1 is included in a DCI on PDCCH transmitted to the first UE, and the reception parameter set RPS2 is included in a DCI on PDCCH transmitted to the second UE. The first UE reads the DCI on PDCCH so as to be configured with the transmission parameter set TPS1 and the reception parameter set RPS1. The second UE also reads the DCI on PDCCH so as to be configured with the transmission parameter set TPS2 and the reception parameter set RPS2. Accordingly, the first UE generates DM-RS based on the transmission parameter set TPS1 for D2D communication, and the second UE generates DM-RS based on the transmission parameter set TPS2 for D2D communication. On the other hand, the first UE processes the DM-RS in the receiving signals based on the reception parameter set RPS1 for D2D communication, and the second UE process the DM-RS in the receiving signal based on the reception parameter set RPS2 for D2D communication. Consequently, the first UE and the second UE can properly decode the DM-RS signals for the D2D communication.

Note that the transmission/reception parameters are not limited to RNTI or the parameters for DM-RS. Other parameters related to data transmission and reception for the D2D communication may be configured to the UEs by the network in a similar way according to the process 90.

In the prior art, the network assigns the UEs uplink-downlink configuration in a system information for TDD operation; however, the uplink-downlink configuration cannot be readily used for D2D communication. In comparison, the present invention needs the network to configure the UEs at least one uplink subframe and at least one downlink subframe for D2D communication, wherein the uplink subframe for the D2D communication of the first UE is the downlink subframe for the D2D communication of the second UE, and the downlink subframe for the D2D communication of the first UE is the uplink subframe for the D2D communication of the second UE. In addition to scheduling complementary subframe configurations for two UEs of the D2D communication, the network also configures a reception parameter of the first UE as a transmission parameter of the second UE and configures a transmission parameter of the first UE as a transmission parameter of the second UE for the D2D communication. Thus, data transmission and reception for the D2D communication can be processed correctly in the UEs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling data transmission and reception for a device to device (D2D) communication between a first user equipment (UE) and a second UE for a network in a wireless communication system, the method comprising:
  configuring the first UE a first parameter as one transmission parameter of the first UE, and configuring the first UE a second parameter as one reception parameter of the first UE; and
  configuring the second UE the second parameter as one transmission parameter of the second UE, and configuring the second UE the first parameter as one reception parameter of the second UE;
  wherein the first UE encodes signals according to the first parameter and decodes signals received from the second UE according to the second parameter, and the second UE encodes signals according to the second parameter and decodes signals received from the first UE according to the first parameter.

2. The method of claim 1, wherein the network configures the first UE and the second UE for the D2D communication via radio resource control (RRC) configuration or dynamic configuration.

3. The method of claim 1, wherein the first parameter and the second parameter are dedicated for the D2D communication.

4. The method of claim 1, wherein the first parameter and the second parameter are used for both the D2D communication and non-D2D communication.

5. A communication device for handling data transmission and reception for a device to device (D2D) communication between a first user equipment (UE) and a second UE in a wireless communication system, the communication device comprising:
  a processing means; and
  a storage unit, coupled to the processing means, for storing a program code, wherein the program code instructs the processing means to execute the following steps:
    configuring the first UE a first parameter as one transmission parameter of the first UE, and configuring the first UE a second parameter as one reception parameter of the first UE; and
    configuring the second UE the second parameter as one transmission parameter of the second UE, and configuring the second UE the first parameter as one reception parameter of the second UE;
  wherein the first UE encodes signals according to the first parameter and decodes signals received from the second UE according to the second parameter, and the second UE encodes signals according to the second parameter and decodes signals received from the first UE according to the first parameter.

6. The communication device of claim 5, wherein the communication device configures the first UE and the second UE for the D2D communication via radio resource control (RRC) configuration or dynamic configuration.

7. The communication device of claim 5, wherein the first parameter and the second parameter are dedicated for the D2D communication.

8. The communication device of claim 5, wherein the first parameter and the second parameter are used for both the D2D communication and non-D2D communication.

* * * * *